United States Patent [19]

Wium

[11] Patent Number: 4,801,118
[45] Date of Patent: Jan. 31, 1989

[54] CABLE PROTECTION SYSTEM INCLUDING A CONDUIT BODY AND A CLIP

[75] Inventor: Eigil Wium, Cheshire, Conn.

[73] Assignee: General Signal Corporation, Stamford, Conn.

[21] Appl. No.: 142,290

[22] Filed: Jan. 4, 1988

Related U.S. Application Data

[63] Continuation of Ser. No. 73,347, Jul. 10, 1987, which is a continuation of Ser. No. 794,927, Nov. 4, 1985, abandoned.

[51] Int. Cl.$^4$ .............................................. B66D 1/36
[52] U.S. Cl. .................................. 248/300; 248/345.1; 254/134.3 R; 24/546
[58] Field of Search ............... 248/200, 205.1, 213.2, 248/300, 345.1, 360, 359.1; 24/545, 546, 555, 456, 563, 67.9; 174/71 R, 81; 254/134.3 FT, 134.3 R

[56] References Cited

U.S. PATENT DOCUMENTS

| | | | |
|---|---|---|---|
| 1,256,426 | 2/1918 | Baltzley | 24/456 |
| 2,021,609 | 11/1935 | Pippert | 24/546 |
| 2,636,240 | 4/1953 | Pokorny | 248/213.2 |
| 2,809,004 | 10/1957 | Kaufman | 248/300 |
| 3,922,408 | 11/1975 | Smith | 248/345.1 |
| 3,944,184 | 3/1976 | Fisch | 254/134.3 R |
| 4,261,091 | 4/1981 | Mulkins | 248/345.1 |

FOREIGN PATENT DOCUMENTS

| | | | |
|---|---|---|---|
| 460961 | 11/1949 | Canada | 248/345.1 |
| 885140 | 8/1953 | Fed. Rep. of Germany | 248/345.1 |
| 540085 | 4/1922 | France | 24/545 |
| 800639 | 5/1936 | France | 24/545 |
| 282925 | 1/1928 | United Kingdom | 24/563 |

Primary Examiner—J. Franklin Foss
Assistant Examiner—Robert A. Olson
Attorney, Agent, or Firm—Joseph P. Abate; Robert R. Hubbard

[57] ABSTRACT

A cable guard for use with conduit bodies to faciliate low friction and low abrasion, threading or pulling of cable through cable openings in the body. The cable guard consists of a tubular clip having a longitudinal or elongated slot extending its entire length and adapted to fit in gripping and removeable engagement with the rim or lip portion of the conduit body access opening. The clip also has a pair of notches positioned at opposite ends and opposite the longitudinal slot to facilitate installation of the clip at the narrow end of an elongated conduit body access opening and to prevent the clip from rolling when in use. The clip has still another pair of notches positioned intermediate its ends and on opposite sides of the longitudinal slot to facilitate removal of the clip from the conduit body.

10 Claims, 1 Drawing Sheet

CABLE PROTECTION SYSTEM INCLUDING A CONDUIT BODY AND A CLIP

This is a continuation of application Ser. No. 073,347, filed July 10, 1987, which is a continuation of application Ser. No. 794,927, filed Nov. 4, 1985, now abandoned.

BACKGROUND OF THE INVENTION

This invention relates to a cable guard for use with conduit bodies to facilitate low friction and low abrasion threading or pulling of cable through openings in the body.

Conduit bodies are used in conduit installations to connect adjacent conduit either in the same direction or at a angle to one another. A conduit body generally has a pair of openings for such connectivity and an access opening to facilitate the pulling of a cable through the conduit runs as well as for splicing or maintenance purposes. The access opening is adapted to be fitted with a cover to protect the body from the environment.

Conduit bodies are generally produced by a casting process that may leave a rough surface along the peripheral edge or rim of the access opening. The rough surface presents a relatively high friction and an abrasive effect to cable insulation during cable pulling operations.

DESCRIPTION OF THE PRIOR ART

One prior art technique of reducing friction and abrasion for cable pulling operations in a conduit body is disclosed in U.S. Pat. No. 3,200,332. This technique employs smooth surface rollers positioned at the access opening in relation to the cable threading or connectivity openings so as to present low friction to the cable pulling operation and to protect the cable from the rough edge of the access opening. However, this construction is expensive since (1) the roller assembly consists of numerous pieces (three in one design and six in another) which must be assembled and (2) the conduit body casting for the three piece construction must be designed to accommodate roller mounting. That is, the three piece roller construction is only useable with specially casted conduit bodies and is generally not removeable once installed.

SUMMARY OF THE INVENTION

An object of this invention is to provide a novel and improved cable guard for use with conduit bodies to facilitate the pulling of cable through such bodies in an abrasion free manner with low friction.

Another object of this invention is to provide a cable guard which is field installable, removeable and reuseable.

Still another object of this invention is to provide a cable guard which consists of a simple one piece construction.

A cable guard embodying the present invention comprises a tubular clip having a longitudinal slot extending its entire length and adapted to fit in gripping and removeable engagement with the rim or lip portion of the conduit body access opening. The clip is further characterized in a preferred embodiment by a pair of notches, one at each end, and positioned in the clip surface opposite the longitudinal slot to facilitate installation of the clip at the narrow end of an elongated conduit body access opening, and to prevent the clip from rolling when in use. The clip is still further characterized in yet another preferred embodiment by an additional pair of notches, one on either side of the longitudinal slot, and positiond in the clip surface to facilitate removal of the clip from the conduit body by means of a tool such as a screw driver.

BRIEF DESCRIPTION OF THE DRAWINGS

In the accompanying Drawing, like reference characters denote like elements of structure, and.

DESCRIPTION OF PREFERRED EMBODIMENT

It is contemplated that the cable guard of the present invention may be used with any conduit body which has (1) a pair of cable or conduit connectivity openings through which cable is adapted to be threaded or pulled, and (2) an access opening characterized by a rim or lip portion of the body extending inwardly of the access opening. As such, the conduit body may assume any of several shapes adapted for the same or change of direction in conduit runs. It is further contemplated that cable guards embodying the present invention may be employed with conduit runs for either electrical cable or fiber optic cable. However, by way of example and completeness of description, a cable guard embodying the present invention is illustrated herein for use with an L-shaped (elbow) conduit body for an electrical cable installation.

Figure 1:
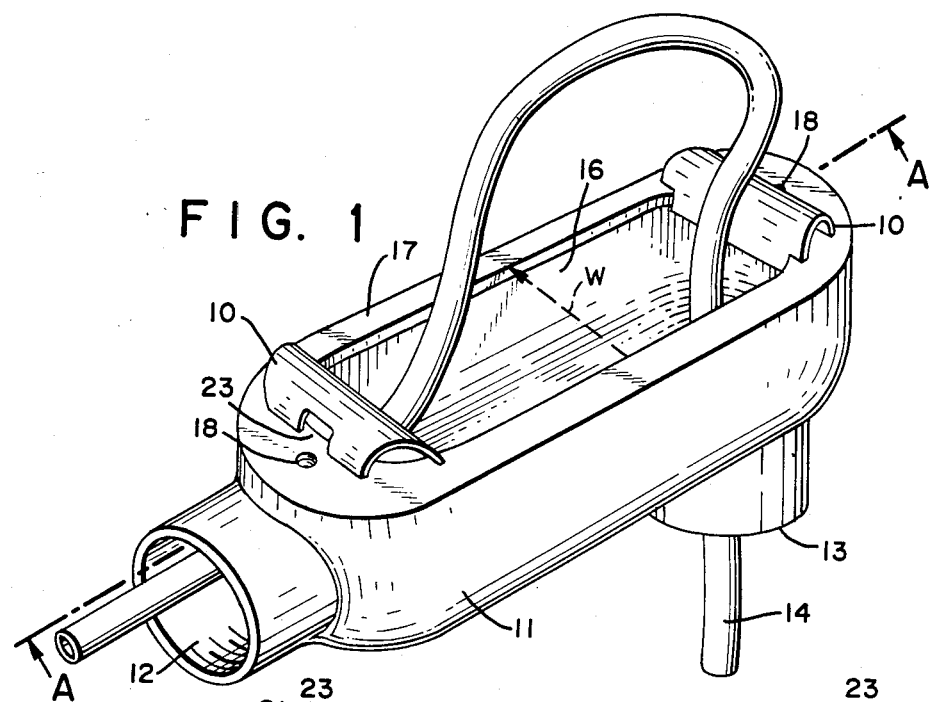
FIG. 1 is a perspective view illustrating a cable guard embodying the present invention and its use with an exemplary conduit body shape.
Figure 1A:
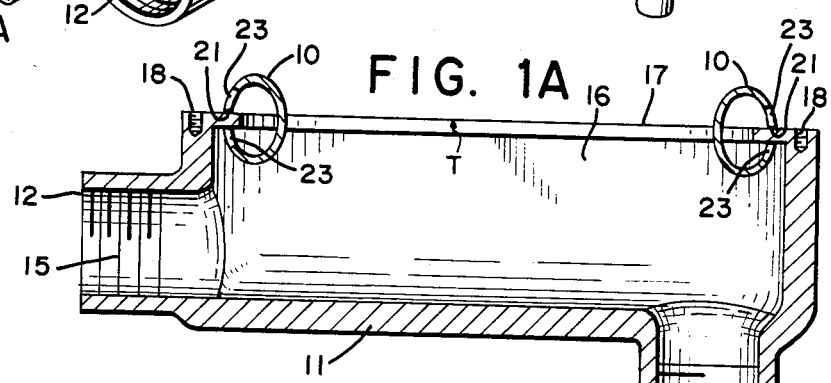
FIG. 1A is a sectional view taken along the lines A—A of FIG. 1.

With reference now to the perspective view of FIG. 1 and the sectional view of FIG. 1A taken along lines A—A of FIG. 1, there is illustrated a pair of cable guards 10 embodying the present invention installed on an exemplary conduit body 11. The conduit body 11 is generally L-shaped in order to facilitate a change of direction in a conduit run. To this end, the conduit body 11 has a pair of openings 12 and 13 positioned at a right angle to one another and adapted for connectivity to conduit (not shown) and for the threading of a cable 14 therethrough. The openings 12 and 13 are illustrated to have screw threads 15 for the purpose of connection with mating screw thread disposed on the conduit (not shown).

The conduit body 11 has a cable access opening 16 formed by a lip or rim portion 17 of the body 11 extending inwardly of the access opening. The lip portion 17 has a generally flat upper surface adapted to mate with a like flat surface of a closure top or cover (not shown) for closing the interior of the conduit body 11 and the cable 14 to the environment. To facilitate attachment of the cover, the conduit body 11 is provided with a pair of screw holes 18.

In threading the cable 14 through the conduit body 11, access opening 16 allows the cable to be pulled to form a loop extending outwardly from the access opening. This facilitates bending of the cable through a relatively large radius and allows it to be fed more easily from one conduit to another.

The conduit body 11 is produced by a casting process which may result in a surface which is coarse relative to the surface of the cable 14, thereby resulting in relatively high friction to the cable pulling action as well as scraping and/or cutting of the cable insulation. The friction and abrasive effect is considerably reduced by the cable guards 10 which have a much larger radius and a much smoother surface than the lip surrounding the access opening. The cable guards 10 may be fabricated from either plastic or metallic material that has a spring like property to facilitate a firm grip on the casting lip. In one preferred embodiment, the cable guards 10 are fabricated from a carbon steel such as C1050. The spring like property is achieved through heat treatment of the cable guard clip (spring tempering) to obtain the flexibility necessary to accommodate various lip thickness and get a firm grip of the casting lip.

Figure 2:
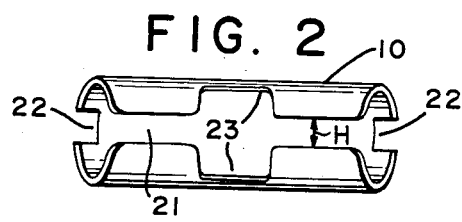
FIG. 2 is a plan view of a tubular clip cable guard embodying the present invention.
Figure 3:
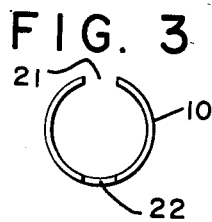
FIG. 3 is an end view of the tubular clip cable guard illustrated in FIG. 2.

Referring now to the plan and end views of FIGS. 2 and 3, the cable guard 10 comprises a one piece construction in the form of a tubular clip having a longitudinal slot in 21 extending its entire length. The slot width (H) is slightly less than the thickness (T) of the lip portion 17 of the conduit body 11 in FIG. 1 so as to allow the tubular clip to be fitted in gripping and removeable engagement with such lip portion as illustrated in FIGS. 1 and 1A.

The length of the tubular clip is preferably long enough to maintain the cable 14 in contact therewith during cable pulling operations. For an elongated access opening such as access opening 16 in FIG. 1, the tubular clip length is slightly larger than the width (W) of the access opening. In order to accommodate the difference and to facilitate ease of installation, the tubular clip is provided with a pair of notches 22, each positioned at opposite ends of the clip and 180 degrees about the surface from the slot 21. The longitudinal distance between the notches 22 is less than the width (W) of the access opening 16 while the notches 22 are each slightly wider than the thickness (T) of the lip portion 17 so as to allow the clip to be inserted lengthwise of the elongated opening and then rotated to the position shown in FIG. 1 where the lip portion 17 fits in mating relationship with the notches. The notches also serve to prevent the clip from rolling during pulling operations.

Although the tubular clip is generally hand removable from engagement with the lip 17 of the conduit body, the conduit body casting process can result in a surface roughness which would make removal by hand difficult at times. In order to facilitate ease of removal, the tubular clip is provided with an additional pair of notches 23, one on either side of the longitudinal slot 21 and located approximately midway between the ends of the clip. The size of the notches 23 is such as to permit the use of a tool such as a screw driver to disengage the clip (as by prying) from the conduit body lip portion 17.

Figure 4:
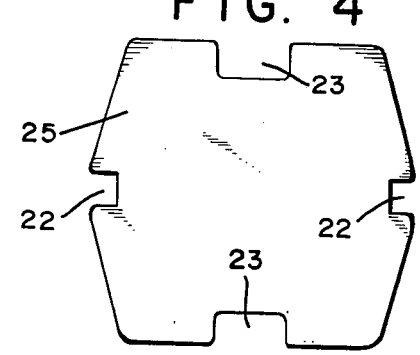
FIG. 4 is a plan view of the cable guard in a flat blank form which is shaped in a manufacturing step into the tubular clip form of FIGS. 2 and 3.

Metallic embodiments of the tubular clip are preferably formed by a cutting or a stamping operation from a carbon steel strip to form blanks such as the blank 25 illustrated in the plan view of FIG. 4. The blanks are then rolled into a tubular clip and heat treated to achieve an appropriate spring temper. To provide even lesser friction and also for rust protection, the tubular clip is preferably coated with a low friction plastic material such as poly-tetra-fluoro-ethylene or nylon or electroplated with a metallic finish such as zinc.

Although the preferred embodiment of the invention has been shown in the drawings, it is to be understood that this disclosure is for the purpose of illustration only and that various changes in material, design and dimensions may be made without departing from the spirit and scope of the invention set forth in the appended claims.

What is claimed is:

1. A system for protecting a cable from abrasion and facilitating a pulling of the cable through cable openings in a conduit body, the system comprising:
   a conduit body including a lip which forms an access opening; and
   an elongated tubular clip which forms a longitudinal slot and which forms at least one notch, the slot facing in a first direction generally perpendicular to the longitudinal axis of the tubular clip, the at least one notch facing in a second direction generally parallel with the longitudinal axis, a first portion of the lip being disposed within the longitudinal slot and a second portion of the lip being disposed within the at least one notch.

2. A system as claimed in claim 1, wherein the lip has a thickness, and wherein the notch has a width slightly greater than the thickness of the lip.

3. A system as claimed in claim 2, wherein the tubular clip forms a second notch facing in a third direction which is generally opposite to the second direction, and wherein a third portion of the lip is disposed within the second notch.

4. A system as claimed in claim 3, wherein the access opening has a width, and wherein the longitudinal distance between the first and second notches is less than the width of the access opening.

5. A system as claimed in claim 3, wherein the tubular clip consists essentially of a resilient material.

6. A system as claimed in claim 5, wherein the resilient material is a spring tempered carbon steel.

7. A system as claimed in claim 3, wherein a smooth coating consisting essentially of a low friction material is disposed on an outer surface of the clip.

8. A system as claimed in claim 7, wherein the low friction material is polytetrafluoroethylene.

9. A system as claimed in claim 7, wherein the low friction material is a nylon.

10. A system as claimed in claim 1, wherein the tubular clip has a larger outer radius.

* * * * *